UNITED STATES PATENT OFFICE.

SPENCER B. NEWBERRY AND HARVEY N. BARRETT, OF BAYBRIDGE, OHIO.

PROCESS OF MAKING FERTILIZER.

1,074,808. Specification of Letters Patent. Patented Oct. 7, 1913.

No Drawing. Application filed September 30, 1910. Serial No. 584,628.

*To all whom it may concern:*

Be it known that we, SPENCER B. NEWBERRY and HARVEY N. BARRETT, citizens of the United States, residing at Baybridge, in the county of Erie and State of Ohio, have invented a certain new and useful Improvement in Processes of Making Fertilizers, of which the following is a specification.

Our invention relates to the conversion of the insoluble phosphate of lime and phosphate of alumina and iron contained in mineral or animal phosphates into citrate-soluble form, by which the natural phosphates are converted into a useful and efficient fertilizer for the support of plant growth. This we accomplish by grinding the raw phosphate to powder with the addition of gypsum or sulfate of lime, preferably with the addition of carbon in the form of coal, coke or charcoal, or other carbonaceous substance, and calcining the mixed and ground materials at high temperature. The calcined product is preferably ground to fine powder for use. We find that by this simple and inexpensive method practically all the phosphates of lime, iron and alumina present in the raw material are rendered soluble in ammonium citrate. This effect we ascribe to the decomposition which gypsum undergoes, with liberation of sulfur dioxid and oxygen, when calcined at high temperature, and to the decomposing effect of the sulfur dioxid evolved on the insoluble phosphates present. This decomposition of gypsum by heat is greatly facilitated by the addition of carbon or other reducing substance, which has the effect of converting the gypsum into calcium sulfite, which easily gives up its sulfur dioxid under the influence of heat. The lime remaining after the decomposition of the gypsum also aids in rendering the phosphate soluble. The quantity of gypsum and carbon required varies with the richness of the phosphate treated. In general, we have found an amount of gypsum and of carbon or coal, each approximately equal to two-thirds of the amount of phosphoric acid, $P_2O_5$, contained in the raw phosphate, to be a suitable proportion. We do not, however, wish to limit ourselves to these proportions, as good results can be obtained by the use of greater or less amounts of gypsum and carbon than those stated.

As an example of the practical working of our process we take ordinary phosphate rock or other mineral or animal phosphate, mix with it the required amount of gypsum and coal or coke, reduce the mixing materials to fine powder by ordinary dry or wet grinding, and introduce the ground mixture into a revolving kiln heated internally by a flame of gas, coal-dust or oil, and similar in construction and operation to the kilns used in burning Portland cement. The temperature of calcination is approximately equal to that of cement burning, estimated at from 2500 degrees to 2700 degrees F. The speed of revolution of the kiln and rate of introduction of feed and fuel are so adjusted that the product shall be free from unconsumed carbon and practically free from sulfates. After grinding to powder this product is then ready for use as fertilizer or as an ingredient of commercial fertilizers.

We claim:

1. The process of making fertilizer by grinding together insoluble phosphate and an amount of gypsum and of carbonaceous matter each approximately equal to two-thirds the phosphoric acid contained in the phosphate, calcining the mixture and grinding the calcined product.

2. The process of making fertilizer by grinding together insoluble phosphate and an amount of gypsum and of carbonaceous matter each approximately equal to two-thirds the phosphoric acid contained in the phosphate, calcining the mixture until the gypsum is substantially decomposed and the carbonaceous matter oxidized and expelled, and grinding the calcined product.

SPENCER B. NEWBERRY.
HARVEY N. BARRETT.

Witnesses:
WILLIAM L. TROST,
ALLEN KUBACH.